(12) United States Patent
Alben

(10) Patent No.: US 8,436,866 B2
(45) Date of Patent: *May 7, 2013

(54) INTER-FRAME TEXEL CACHE

(75) Inventor: Jonah M. Alben, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/245,769

(22) Filed: Sep. 26, 2011

(65) Prior Publication Data

US 2012/0017048 A1   Jan. 19, 2012

Related U.S. Application Data

(63) Continuation of application No. 12/618,772, filed on Nov. 15, 2009, now abandoned, which is a continuation of application No. 11/424,659, filed on Jun. 16, 2006, now Pat. No. 7,631,145.

(60) Provisional application No. 60/693,987, filed on Jun. 23, 2005.

(51) Int. Cl.
*G09G 5/36* (2006.01)
*G06F 13/00* (2006.01)
*G06F 13/28* (2006.01)

(52) U.S. Cl.
USPC .......................................... 345/557; 711/118

(58) Field of Classification Search .................. None
See application file for complete search history.

(56) References Cited

U.S. PATENT DOCUMENTS

| | | | |
|---|---|---|---|
| 5,003,459 A | 3/1991 | Ramanujan et al. | |
| 5,737,751 A | 4/1998 | Patel et al. | |
| 6,426,753 B1 * | 7/2002 | Migdal | 345/506 |
| 6,549,210 B1 * | 4/2003 | Van Hook et al. | 345/561 |
| 6,717,577 B1 | 4/2004 | Cheng et al. | |
| 7,631,145 B1 * | 12/2009 | Alben | 711/118 |
| 7,644,234 B2 * | 1/2010 | Sasaki et al. | 711/128 |
| 2003/0005233 A1 | 1/2003 | Stewart et al. | |
| 2004/0107318 A1 | 6/2004 | Bono et al. | |
| 2010/0057993 A1 | 3/2010 | Alben | |

OTHER PUBLICATIONS

Schmittler et al., A Virtual Memory Architecture for Real-Time Ray Tracing Hardware, Computer & Graphics 27, 2003, pp. 693-699.*
Non-Final Office Action mailed on Feb. 20, 2009 for U.S. Appl. No. 11/424,659, filed Jun. 16, 2006, 12 pages.
Notice of Allowance mailed on Aug. 20, 2009 for U.S. Appl. No. 11/424,659, filed Jun. 16, 2006, 10 pages.
Non-Final Office Action mailed on Aug. 2, 2010 for U.S. Appl. No. 12/618,772, filed Nov. 15, 2009, 7 pages.

* cited by examiner

*Primary Examiner* — Kee M Tung
*Assistant Examiner* — Haixia Du
(74) *Attorney, Agent, or Firm* — Kilpatrick Townsend & Stockton LLP

(57) ABSTRACT

Methods, apparatuses, and systems are presented for caching. A cache memory area may be used for storing data from memory locations in an original memory area. The cache memory area may be used in conjunction with a repeatedly updated record of storage associated with the cache memory area. The repeatedly updated record of storage can thus provide a history of data storage associated with the cache memory area. The cache memory area may be loaded with entries previously stored in the cache memory area, by utilizing the repeatedly updated record of storage. In this manner, the record may be used to "warm up" the cache memory area, loading it with data entries that were previously cached and may be likely to be accessed again if repetition of memory accesses exists in the span of history captured by the repeatedly updated record of storage.

12 Claims, 5 Drawing Sheets

INTER-FRAME TEXEL CACHE

CROSS-REFERENCES TO RELATED APPLICATIONS

This application is a continuation of U.S. patent application Ser. No. 12/618,772, filed Nov. 15, 2009, which is a continuation of U.S. patent application Ser. No. 11/424,659, filed Jun. 16, 2006, now U.S. Pat. No. 7,631,145, which claims the benefit of U.S. Provisional Patent Application No. 60/693,987, filed Jun. 23, 2005, which are incorporated by reference.

BACKGROUND OF THE INVENTION

Typical cache designs provide a dedicated area of memory to separately store a subset of a larger portion of data in memory. By storing data that is likely to be accessed again in the future in the dedicated area of memory, which may be more quickly or otherwise more efficiently accessed, overall efficiency of data access may be greatly improved. An underlying assumption of typical cache designs is locality of access, which refers to the likelihood that data accessed at one point in time is likely to be accessed again. If the subset of data stored in the dedicated memory area is likely to be accessed again in the future, the cache may be capable of achieving high levels of efficiency. On the other hand, if the subset of data stored in the dedicated memory area is not likely to be accessed again in the future, the cache is unlikely to achieve an acceptable measure of efficiency.

In many computer systems, only a limited amount of dedicated memory area may be available for implementing a cache system. Depending on the nature of the data to be accessed, the limited amount of dedicated memory area may be insufficient to provide an efficient cache system following traditional cache designs. For example, one type of data that has potential for utilizing efficient caching is graphics data such as texel data to be accessed from memory by a graphics processing system and rendered on a display. From one frame to the next, there may be a high degree of locality of access. In other words, a high number of the memory locations accessed to retrieve texel data for the current frame rendered on the display may be accessed again to retrieve the same texel data for the next frame rendered on the display. This may often be the case, for instance, in situations where the rendered image remains largely unchanged from one frame to the next. Such locality of access from one frame to the next frame presents a potential for implementation of an efficient cache system.

However, a prohibitively large amount of dedicated memory area may be required to exploit such locality of access, when traditional cache designs are utilized. In this example, the locality of access exists across frames. That is, a piece of texel data that is currently accessed is likely to be accessed again, but not until the next frame. Here, a traditional cache design that updates cache memory with the most recently accessed data may require enough dedicated memory area to provide caching for a full frame worth of texel data accesses, in order for the cache to perform properly. Otherwise, the cache may run out of memory space and begin overwriting useful cache entries stored from the current frame, before those cache entries are ever accessed in the next frame. Thus, cache entries that would have produced "hits" (a data access request that result in a match in the cache) in such a system may be destroyed prematurely, leading to an extremely low "hit rate" (ratio of data access requests that result in a match in the cache).

FIG. 1 is a block diagram of an illustrative computer system 100 containing memory components for which efficient data caching may be employed. As shown, computer system 100 includes a graphics card 102, a central processing unit (CPU) 104, a chipset comprising a northbridge chip 106 and a southbridge chip 108, system memory 110, PCI slots 112, disk drive controller 114, universal serial bus (USB) connectors 116, audio CODEC 118, a super I/O controller 120, and keyboard controller 122. As shown in FIG. 1, graphics card 102 includes a graphics processing unit (GPU) 124 and local memory 126. Also, graphics card 102 is connected to a display 128 that may be part of computer system 100. Here, GPU 124 is a semiconductor chip designed to perform graphics processing operations associated with rendering an image that may be presented on display 128.

Data residing in local memory 126 may be used as input data in the graphics rendering process, which produces a final image for presentation on display 128. Alternatively or additionally, data residing in system memory 110 may also be used as input data in the graphics rendering process. These accesses to memory performed by GPU 124 may be associated with significant latencies that impact the performance of the system. It may thus be desirable to provide a data caching system so that GPU 124 may access such data in a more efficient manner.

However, as discussed above, usage of the large amount of dedicated memory area required for caching data using traditional cache designs may simply be impracticable. For example, a typical graphics processing unit implemented as a semiconductor chip, such as GPU 124, may have a limited amount of on-chip memory. This may be the case due to a variety of factors, such as manufacturing cost. The amount of dedicated memory area required to provide caching for a full frame worth of texel data accesses, for instance, may simply be too large to fit within the limited on-chip memory associated with the graphics processing unit. One alternative may be to forego the advantages of caching and design the system to accommodate deficiencies such as higher latencies associated with memory accesses without caching. Such a system is likely to incur high area costs associated with the accommodation of high access latency. Another alternative may be to simply implement a traditional cache design using the limited amount of memory area available, even though it may be insufficient to fully exploit the temporal locality of access of the underlying data. As previously mentioned, this likely leads to an inefficient cache characterized by an extremely low hit rate. Such a system is also likely to have inferior memory access performance.

Thus, there is an urgent need for an improved cache design capable of utilizing a limited amount of memory area to achieve efficient data caching.

BRIEF SUMMARY OF THE INVENTION

The present invention relates to methods, apparatuses, and systems for caching data. A cache memory area may be used for storing data from memory locations in an original memory area. The cache memory area may be used in conjunction with a repeatedly updated record of storage associated with the cache memory area. The repeatedly updated record of storage can thus provide a history of data storage associated with the cache memory area. The cache memory area may be loaded with entries previously stored in the cache memory area, by utilizing the repeatedly updated record of storage. In this manner, the record may be used to "warm up" the cache memory area, loading it with data entries that were previously cached and may be likely to be accessed again if repetition of memory accesses exists in the span of history captured by the repeatedly updated record of storage.

In one embodiment of the invention, the repeatedly updated record of storage comprises a sequence of first memory allocations, each of the first memory allocations capable of storing a plurality of entries each comprising a tag for referencing a memory location in the original memory area. Further, the cache memory area comprises a sequence of second memory corresponding to a limited range of the sequence of first memory locations, each of the second memory allocations capable of storing a plurality of entries each comprising a data value associated with a memory location in the original memory area. In this embodiment, accesses occur to at least one of the second memory allocations, and the limited range to which the second sequence of memory allocations correspond is advanced by unloading data from one of the second memory allocations and loading one of the second memory allocations with data corresponding to entries stored in a subsequent one of the sequence of first memory allocations.

The sequence of second memory allocations may be implemented as on-chip memory within a semiconductor chip containing a system requesting access to a memory location in the original memory area, wherein the sequence of first memory allocations is implemented as off-chip memory that is not part of the semiconductor chip containing the system requesting access to the memory location in the original memory area. The system requesting access may be a graphics processing unit requesting access to texel data stored in the original memory area.

In one embodiment of the invention, each of the plurality of entries stored in each of the first memory allocations comprises both a tag for referencing a memory location in the original memory area and a corresponding data value associated with the memory location. In another embodiment of the invention, each of the first memory allocations is dynamically selected to store either entries each comprising a tag for referencing a memory location in the original memory area or entries each comprising both a tag for referencing a memory location in the original memory area and a corresponding data value associated with the memory location. Each of the plurality of entries stored in each of the second memory allocations may further comprise a tag for referencing a memory location in the original memory area.

The accessing step may comprise reading entries in at least one of the second memory allocations. The accessing step may also comprise replacing entries in at least one of the second memory allocations. The step of unloading one of the second memory allocations may comprise writing changed entries from the second memory allocation back to associated memory locations in the original memory area. The step of unloading one of the second memory allocations may comprise writing changed entries from the second memory allocation back to associated entries in a corresponding first memory allocation. The step of loading one of the second memory allocations with data corresponding to entries stored in the subsequent one of the sequence of first memory allocations may comprise loading only data corresponding to entries having valid tags. The step of loading one of the second memory allocations with data corresponding to entries stored in the subsequent one of the sequence of first memory allocations may comprise loading only data corresponding to entries accessed in a previous frame.

In one embodiment of the invention, caching data from an original memory area may further involve inserting an additional first memory allocation into the sequence of first memory allocations to accommodate additional accesses to memory locations in the original memory area. The sequence of first memory allocations may comprise a head list and a tail list, and wherein the inserting step comprises obtaining the additional first memory allocation from a free list and appending the additional first memory allocation to the head list.

In one embodiment of the invention, caching data from an original memory area may further involve deleting one of the first memory allocations from the sequence of first memory allocations to accommodate deletion of memory accesses to memory locations in the original memory area.

BRIEF DESCRIPTION OF THE DRAWINGS

FIG. 4 is a snapshot of the window of N buckets in the on-chip cache, as a first frame of texel data is initially rendered, with the window corresponding to buckets 0-7, and the replacement bucket corresponding to bucket 0;

FIG. 5 is a snapshot of the window of N buckets in the on-chip cache, as a first frame of texel data is initially rendered, with the window corresponding to buckets 0-7, and the replacement bucket corresponding to bucket 1;

FIG. 6 is a snapshot of the window of N buckets in the on-chip cache, as a first frame of texel data is initially rendered, with the window corresponding to buckets 0-7, and the replacement bucket corresponding to bucket 6;

FIG. 7 is a snapshot of the window of N buckets in the on-chip cache, as a first frame of texel data is initially rendered, with the window corresponding to buckets 1-8, and the replacement bucket corresponding to bucket 7;

FIG. 8 is a snapshot of the window of N buckets in the on-chip cache, as a first frame of texel data is initially rendered, with the window corresponding to buckets 2-9, and the replacement bucket corresponding to bucket 8;

FIG. 9 is a snapshot of the window of N buckets in the on-chip cache, as the next frame of texel data is initially rendered, with the window corresponding to buckets 0-7, and the replacement bucket corresponding to bucket 0;

FIG. 10 is a snapshot of the window of N buckets in the on-chip cache, as the next frame of texel data is initially rendered, with the window corresponding to buckets 0-7, and the replacement bucket corresponding to bucket 4;

FIG. 11 is a snapshot of the window of N buckets in the on-chip cache, as the next frame of texel data is initially rendered, with the window corresponding to buckets 0-7, the replacement bucket corresponding to bucket 4, and occurrence of a first hit in bucket 7; and FIG. 12 is a snapshot of the window of N buckets in the on-chip cache, as the next frame of texel data is initially rendered, with the window corresponding to buckets 1-8, and the replacement bucket corresponding to bucket 4.

DETAILED DESCRIPTION OF THE INVENTION

Basic Cache System Structure

Figure 1:
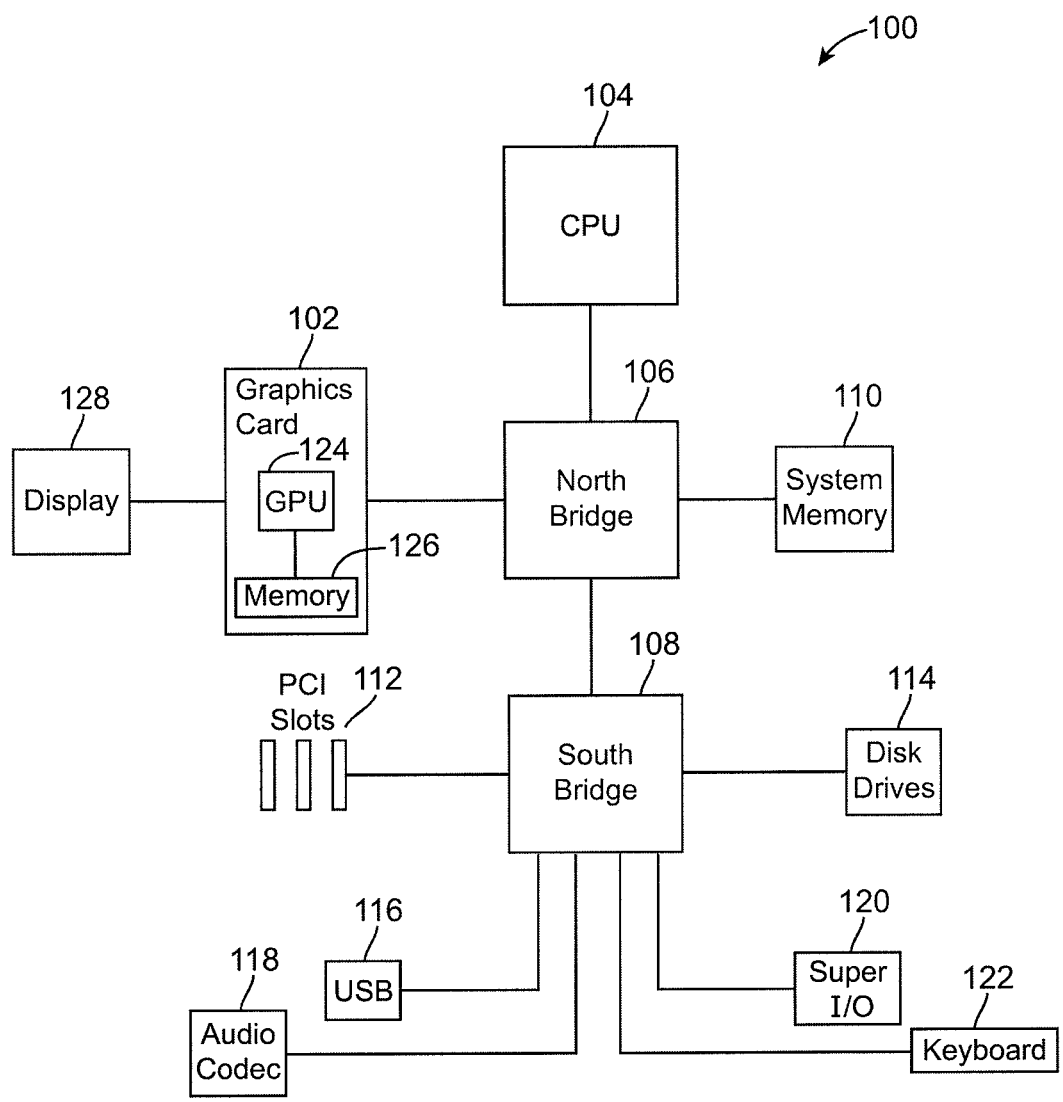
FIG. 1 is a block diagram of an illustrative computer system containing memory components for which efficient data caching may be employed.
Figure 2:
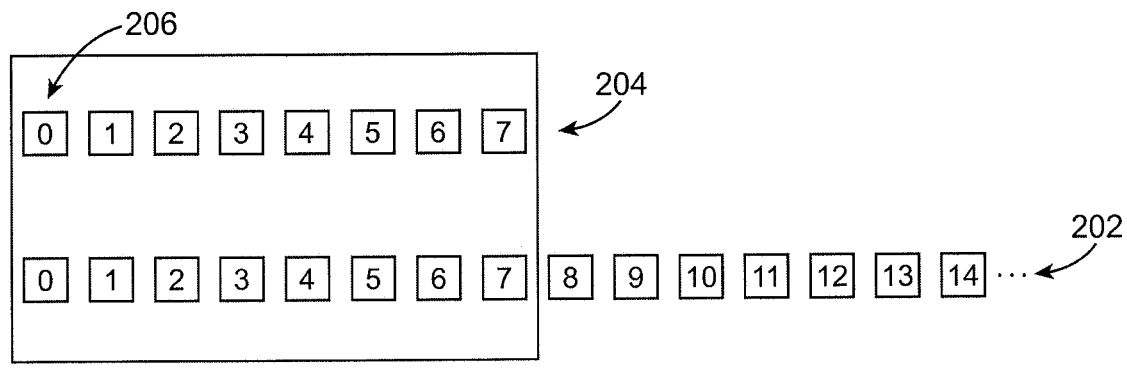
FIG. 2 is a graphical illustration of a cache system containing a sequence of first memory allocations and a second sequence of memory allocations, in accordance with one embodiment of the present invention.

FIG. 2 is a graphical illustration of a cache system containing a sequence of first memory allocations 202 and a second sequence of memory allocations 204, in accordance with one embodiment of the present invention. Together, the sequence of first memory allocations 202 and the sequence of second memory allocation 204 may be used to provide a cache system to cache data from an original memory area. The original memory area may refer to any portion of memory for which it may be appropriate to provide data caching. For instance, the original memory area may refer to parts of a frame buffer that holds data corresponding to pixels within a particular displayable image. In computer system 100 in FIG. 1, for instance, such a frame buffer is accessed by graphics processing unit (GPU) 124 and may be implemented in graphics card local memory 126, system memory 110, or some other memory resource. Thus, the first memory allocations 202 and second memory allocations 204 may be used to provide a cache system for such a frame buffer. According to one embodiment of the invention, the second memory allocations 204 are implemented in a memory area that resides on the same semiconductor chip as the system requesting accesses to data, while the first memory allocations 202 are implemented in a memory area that does not reside on the same semiconductor chip. As such, in the context of computer system 100, the second memory allocations 204 may be implemented in on-chip memory that is part of the semiconductor chip on which GPU 124 is implemented, while the first memory allocations 202 may be implemented in off-chip memory separate from GPU 124, such as graphics card local memory 126 or system memory 110.

Referring back to FIG. 2, the sequence of first memory allocations 202 hold enough tags to represent a history of data accesses that allows locality of access to be exploited. As shown in the figure, the sequence of first memory allocations 202 comprises memory allocations labeled 0 through 14, and so on. Each one of the first memory allocations 202 is capable of storing a plurality of entries. Each such entry may comprise a tag that refers to a memory location in an original memory area. Each one of the first memory allocations 202 may be conceptually described as a "bucket" of entries. Thus, these buckets of entries may be used to hold tags that correspond to a history of data accesses to the original memory area. A sufficient number of the first memory allocations 202, or buckets, are provided so that enough entries of tags may be stored to represent a history of data accesses that allows locality of access to be exploited. For example, for graphical data such as texel data, the locality of access may exist across frames. Thus, the first memory allocations 202 may collectively hold enough tags to represent data accesses corresponding to the rendering of an entire frame of graphical data.

According to one embodiment of the invention, each entry stored in each of the first memory allocations 202 comprises a tag but not a corresponding data value. By not requiring a data value to be stored as part of each entry, the first memory allocations 202 may be implemented using a reduced amount of memory area. In an alternative embodiment, each entry stored in each of the first memory allocations 202 comprises not only a tag but also a corresponding data value. By requiring a data value to be stored as part of each entry, the first memory allocations 202 may be accessed directly to obtain corresponding data values. However, with this approach, the first memory allocations 202 may require a larger amount of memory area to implement.

In yet another embodiment of the present invention, a hybrid technique allows each of the first memory allocations 202 to be dynamically selected between storing entries each comprising a tag or entries each comprising both a tag and a corresponding data value. In one example, in caching graphical data such as texel data, a larger pool of tag buckets and a smaller pool of texel data buckets may be available. Thus, for a particular bucket, storage of data as well as tags versus storage of tags only may be decided dynamically based on various considerations, such as efficiency of directly loading from texel memory, resultant miss rate, and compressibility. For example, both data and tags may be stored if data can be efficiently read from texel memory, without negatively impacting the miss rate, and if the data is highly compressible such that the writing out of both data and tag in compressed form may save read bandwidth on future passes.

Referring back to FIG. 2, the sequence of second memory allocations 204 hold data corresponding to a limited range of the first memory allocations 202. In this manner, the sequence of second memory allocations 204 holds a "window" of cached data. As shown in the figure, the sequence of second memory allocations 204 currently holds data corresponding to tags stored in a limited range of first memory allocations, labeled 0 through 7. Each one of the second memory allocations 204 is capable of storing a plurality of entries. Each such entry may comprise a data value that is associated with a memory location in an original memory area, such as main memory. As in the case of the first memory allocations 202, each one of the second memory allocations 204 may be conceptually described as a "bucket" of entries. Entries in the second memory allocations 204 may thus be used to provide a window of cached data for data accesses to the original memory area.

According to the present embodiment of the invention, the second memory allocations 204 are implemented in a memory area that resides on the same semiconductor chip as the system requesting accesses to data. For example, for a graphics processing unit that accesses graphical data for image rendering, the second memory allocations 204 may be implemented as on-chip memory that is part of the same semiconductor chip on which the graphics processing unit is implemented.

Figure 3:
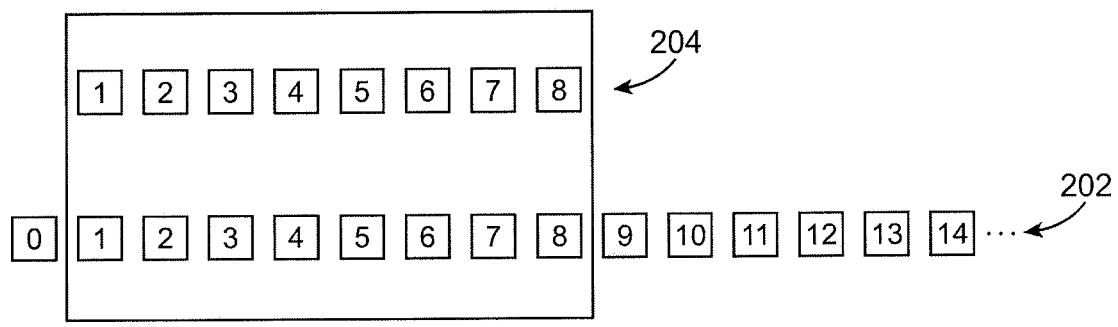
FIG. 3 shows the sequence of first memory allocations and the sequence of second memory allocations previously shown in FIG. 2, with the sequence of second memory allocations having shifted to hold data corresponding to a different range of the first memory allocations.

FIG. 3 shows the sequence of first memory allocations 202 and the sequence of second memory allocations 204 previously shown in FIG. 2, with the sequence of second memory allocations 204 having shifted to hold data corresponding to a different range of the first memory allocations 202. As shown in the figure, the sequence of second memory allocations 204 now holds data corresponding to tags stored in a different range of first memory allocations, labeled 1 through 8. As data access continues, the sequence of second memory allocations 204 may continue to be shifted in this manner to hold data corresponding to different ranges of first memory allocations, moving down the sequence of first memory allocations 202. By storing only a window of data, the sequence of second memory allocations 204 may be implemented using a limited amount of memory space. Because the sequence of first memory allocations 202 contains sufficient tags to represent a history of previous data accesses to the original memory area, the data shifted into the sequence of second memory allocations 202 correspond to memory locations in the original memory area that are likely to be accessed. Thus, the arrangement of the sequence of first memory allocations 202 and sequence of second memory allocations 204, as illustrated in the present embodiment of the invention, allow for greater hit rates to be achieved while utilizing a limited amount of costly memory area.

In the context of a previous example, FIGS. 2 and 3 may illustrate a cache system associated with a graphics processing unit. The cache system may be used to cache texel data stored in main memory that the graphics processing unit accesses to render consecutive frames of graphical images. The cache system may include an off-chip cache (representing first memory allocations 202), organized as a sequence buckets. The cache system may also include an on-chip cache (representing second memory allocations 204), organized as a window of N buckets. As shown in FIGS. 2 and 3, N=8. From one frame to the next, the sequence of texel data accesses may change very little. To exploit this inter-frame locality of access, the off-chip cache may store a full sequence of texel data accesses corresponding to an entire frame of image rendering. Each entry of this data may comprise a tag and a corresponding data value. Alternatively, each entry may comprise only a tag. These entries fill the sequence of buckets in the off-chip cache. By contrast, the on-chip cache only stores a window of N buckets of texel data accesses. Each entry in the on-chip cache may comprise both a tag and a corresponding data value.

In this example, once the sequence of buckets in the off-chip cache have been initialized with data corresponding to an entire frame of image rendering, each new frame that follows may begin with the loading of the window of N buckets in the on-chip cache with data corresponding to the first N buckets in the off-chip cache. As rendering progresses, the window of N buckets in the on-chip cache may be shifted. Here, data may be unloaded from the oldest bucket of the on-chip cache. Then, data corresponding to the next bucket from the sequence of buckets in the off-chip cache may be loaded into the on-chip cache. The window of N buckets in the on-chip cache may thus be shifted to hold data corresponding to different ranges of the sequence of buckets in the off-chip cache.

Examples of Detailed Cache Operations

FIGS. 4 through 12 present a series of snapshots of the N buckets of on-chip cache associated with a cache system utilized by a graphics processing unit for rendering consecutive frame of texel data, corresponding to the example mentioned above in accordance with one embodiment of the invention. These snapshots illustrate in further detail cache operations that may be performed in connection with the N buckets of the on-chip cache. In each of these snapshots, "v" labels one of the N buckets of the on-chip cache as the replacement bucket. As the graphics processing unit accesses data for rendering texel data, a determination may be made as to whether each requested data access can be obtained from a cache entry in one of the N buckets. If so, the determination results in a "hit," and the requested data is obtained from the cached entry. Otherwise, the determination results in a "miss," and the requested data is obtained from the original memory area. The requested data obtained from the original memory area upon a "miss" is typically added as a new entry into the on-chip cache, replacing an old entry that is evicted as a result. The replacement bucket, as marked by "v" in FIGS. 4 through 12, represents the selected bucket, amongst the N buckets, from which such an old entry is to be evicted and replaced. Also, in each of these snapshots, "*" represents recent activity, such as hits and replacements, that has taken place in particular ones of the N buckets.

Figures 4, 5, 6, 7:
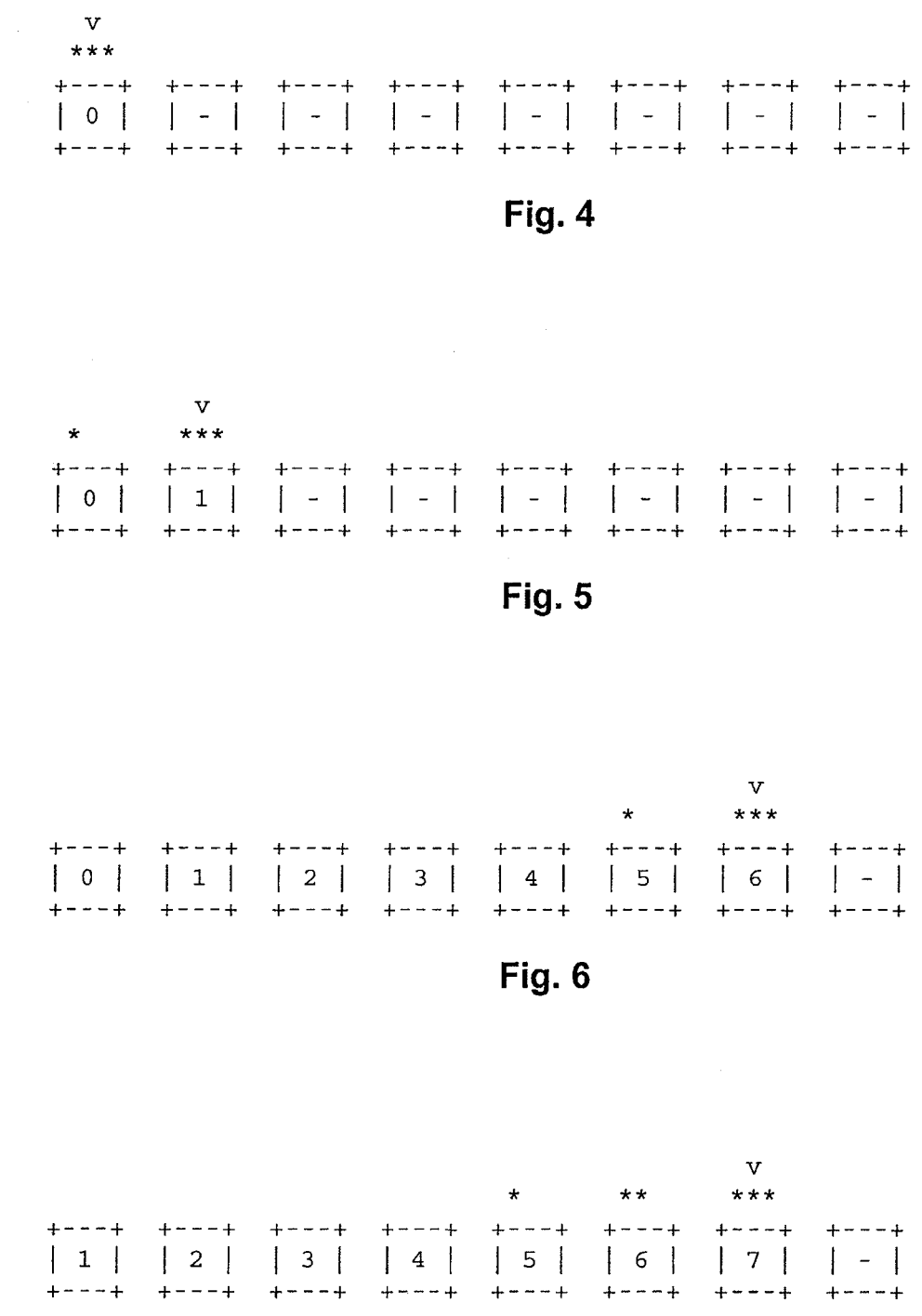

FIG. 4 is a snapshot of the window of N buckets in the on-chip cache, as a first frame of texel data is initially rendered, with the window corresponding to buckets 0-7, and the replacement bucket corresponding to bucket 0. Here, each of the N buckets are initially empty. Thus, there are no hits and the buckets are filled with new entries as texel data is accessed for the first frame, beginning with bucket 0. According to one embodiment of the invention, a replacement policy for choosing which of the N buckets to select as the replacement bucket, when there is a miss in all N buckets, may include the following rules: (1) start by designating the oldest bucket as the replacement bucket. Once misses start to cause eviction of entries that have been touched in the current frame, make the next bucket in the list the new replacement bucket, (2) advance the replacement bucket if a newer bucket is getting more hits currently, and (3) advance the replacement bucket if it is necessary as result of a window shift. Returning to FIG. 4, bucket 0 is filled with new entries until an entry in bucket 0 that has been touched in the current frame becomes targeted to be evicted. At this point, the replacement bucket is advanced to bucket 1, as illustrated in FIG. 5.

FIG. 5 is a snapshot of the window of N buckets in the on-chip cache, as a first frame of texel data is initially rendered, with the window corresponding to buckets 0-7, and the replacement bucket corresponding to bucket 1. Bucket 1 is filled with new entries until an entry in bucket 1 that has been touched in the current frame becomes targeted to be evicted. At this point, the replacement bucket is advanced to bucket 2. This process continues to fill subsequent buckets until eventually, the replacement bucket is advanced to bucket 6, as illustrated in FIG. 6.

FIG. 6 is a snapshot of the window of N buckets in the on-chip cache, as a first frame of texel data is initially rendered, with the window corresponding to buckets 0-7, and the replacement bucket corresponding to bucket 6. According to the present embodiment of the invention, the window may be shifted whenever there is a hit in the newest bucket (or a miss replacement into the newest bucket). Such a rule tends to cause the texture data to be loaded ahead of the access to such data for rendering, so that the rendering process does not stall waiting for a new bucket to be loaded. Returning to FIG. 6, as bucket 6 is filled with new entries, the replacement bucket may be advanced to the last of the N buckets. At this point, the window of N buckets is advanced. First, data is unloaded from bucket 0, which may involve writing the entries in bucket 0 that have been changed back to memory. A "dirty bit ram" may be employed that uses a bit to indicate whether each entry has been changed. The "dirty bit ram" may reside in the on-chip cache along with the texel data and tag data, as a binary value stored in each entry of each of the N buckets of the on-chip cache. Alternatively, it may reside as packed data in a distinct on-chip memory, stored separately from the entries of each of the N buckets of the on-chip cache. This alternative allows easy access to find the dirty entries. The write back to memory mentioned above may involve updating both the off-chip cache as well as the original memory area. For an entry in the off-chip cache that includes both a tag and a data value, both the tag and the data value may be updated using the changed entry. For an entry in the off-chip cache that includes only a tag, just the tag may be updated using the changed entry. Next, a new bucket 8 is loaded from the off-chip cache. Here, because the current frame is the first frame, bucket 8 initially remains empty. The window of N buckets after this advance is shown in FIG. 7.

FIG. 7 is a snapshot of the window of N buckets in the on-chip cache, as a first frame of texel data is initially rendered, with the window corresponding to buckets 1-8, and the replacement bucket corresponding to bucket 7. As bucket 7 is filled with new entries, the replacement bucket may be advanced to the last of the N buckets. At this point, the window of N buckets is again advanced, in a similar fashion as described with respect to FIG. 6. The window of N buckets after this advance is shown in FIG. 8.

Figures 8, 9, 10:
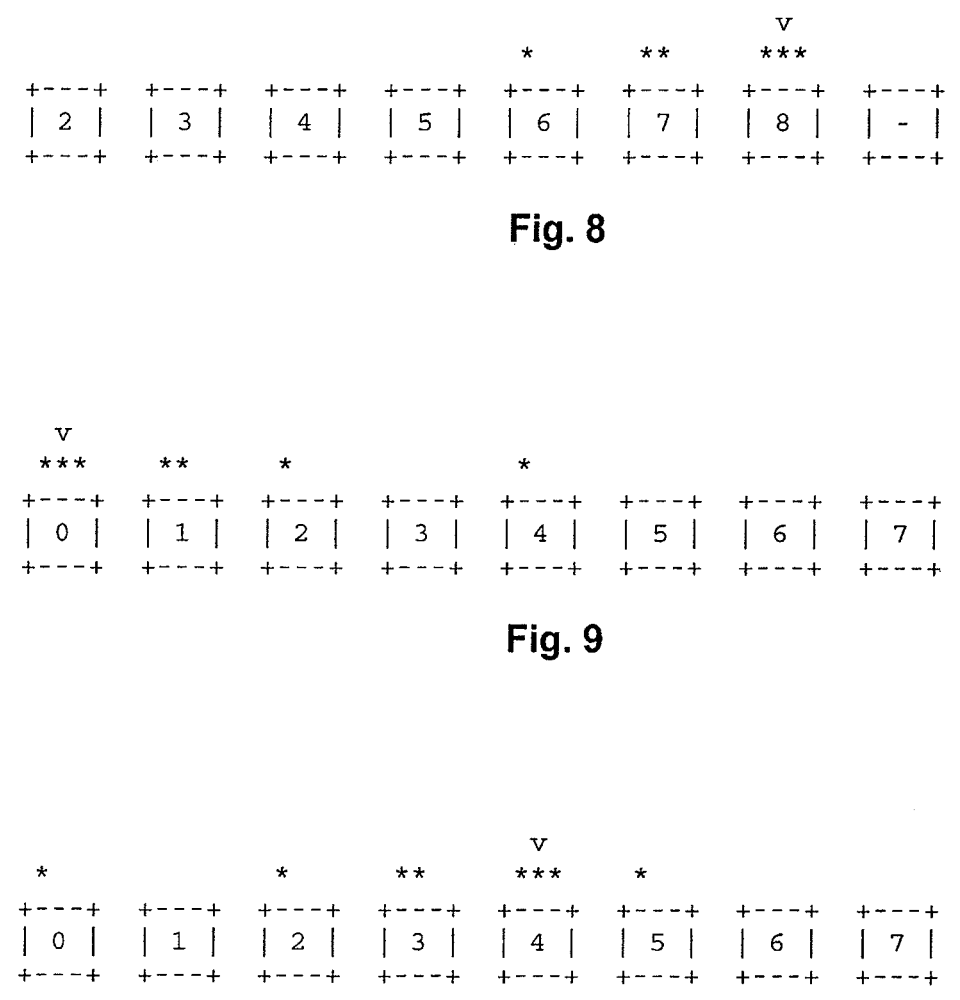

FIG. 8 is a snapshot of the window of N buckets in the on-chip cache, as a first frame of texel data is initially rendered, with the window corresponding to buckets 2-9, and the replacement bucket corresponding to bucket 8. The window of N buckets continues to be advanced in a similar fashion until the end of the frame.

FIG. 9 is a snapshot of the window of N buckets in the on-chip cache, as the next frame of texel data is initially rendered, with the window corresponding to buckets 0-7, and the replacement bucket corresponding to bucket 0. At the start of the next frame following the first frame, the window of N buckets in the on-chip cache is loaded with data corresponding to the first N buckets in the off-chip cache. For an entry in the off-chip cache that comprises both a tag and a data value, the data may be loaded directly from the off-chip cache. For an entry in the off-chip cache that comprises only a tag, the data may be loaded from a memory location in the original memory area referenced by the tag in the off-chip cache entry.

According to one embodiment of the present invention, the on-chip cache is only loaded with those entries in the off-chip cache which are valid and were accessed in the previous frame. This may keep less useful data from being loaded and help to prevent failure conditions such as texture thrash cases. Once the window of N buckets in the on-chip cache has been loaded, it may be checked for requested data accesses, resulting in either a hit or a miss for each data access. Assuming that a high degree of inter-frame locality of access exits, the N buckets may produce mostly hits, along with a few misses. As the number of hits shifts to concentrate in a new bucket, the replacement bucket is shifted to the new bucket.

FIG. 10 is a snapshot of the window of N buckets in the on-chip cache, as the next frame of texel data is initially rendered, with the window corresponding to buckets 0-7, and the replacement bucket corresponding to bucket 4. As shown in FIG. 10, the replacement bucket is shifted to bucket 4, in response to the higher frequency of hits shown for bucket 4.

Figures 11, 12:
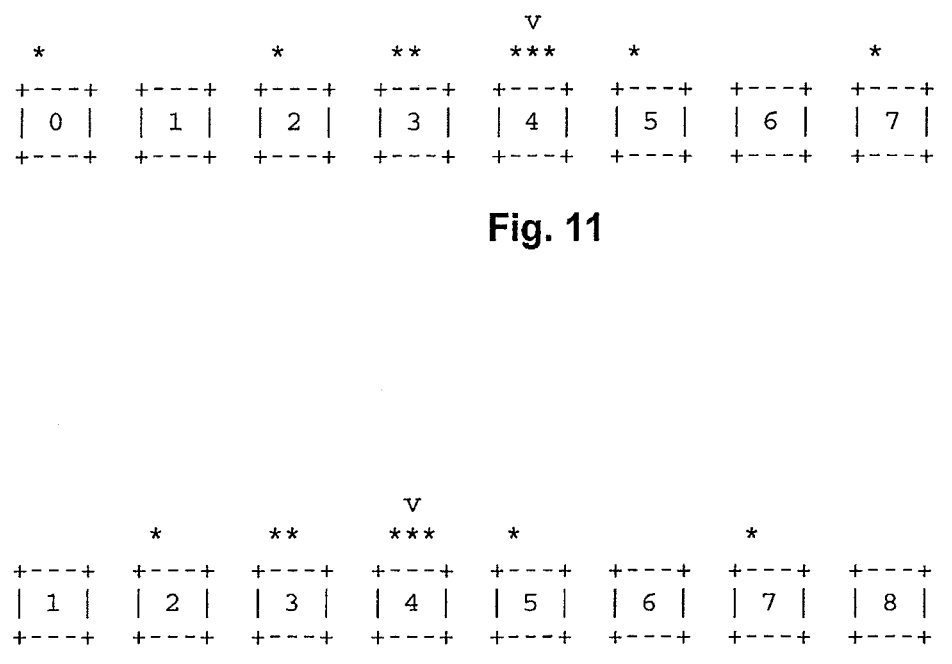

FIG. 11 is a snapshot of the window of N buckets in the on-chip cache, as the next frame of texel data is initially rendered, with the window corresponding to buckets 0-7, the replacement bucket corresponding to bucket 4, and occurrence of a first hit in bucket 7. At some point, the last of the N buckets, shown here as bucket 7, receives a hit. In response, the window of N buckets is advanced, in a similar fashion as described with respect to FIG. 6. The window of N buckets after this advance is shown in FIG. 12.

FIG. 12 is a snapshot of the window of N buckets in the on-chip cache, as the next frame of texel data is initially rendered, with the window corresponding to buckets 1-8, and the replacement bucket corresponding to bucket 4.

Advanced Management of Memory Resources

According to one embodiment of the invention, the sequence of first memory allocations 202 may be implemented as a linked list that is actively managed, by use of insertions and deletions. In the present embodiment of the invention, this is accomplished by maintaining three linked lists: a head list (memory allocations from an initial point of data access to the current point), a tail list (memory allocations that have not received any hits yet), and a free list (unused memory allocations available for insertion). In the example of a graphics processing unit rendering consecutive frames of texel data discussed previously, the head list may represent buckets in the off-chip cache from the beginning of the frame to the current point, and the tail list may represent buckets in the off-chip cache from the current point to the end of the frame. Such a mechanism may be implemented to handle the deletion or addition of a large number of texel data from one frame to the next. Continuing with the graphics processing unit example, when a replacement is to be performed in a bucket that has not gotten any hits yet, an insertion of a new bucket may instead be performed. This may involve breaking the tail list from the head list, shifting the buckets in the head list to make room for a new bucket (and shifting the on-chip cache accordingly), obtaining a new bucket from the free list into which the replacements may be performed, and adding the new bucket to the end of the head list. The first entry of the tail list may be maintained at the end of the on-chip window, until a hit occurs. Then, a hit in the tail list may be found and normal operation may resume. By allowing additional buckets to be inserted in this manner, the addition of a large number of texel data may be managed without writing over existing cache entries.

Further, deletion of a large number of texel data may also be managed by detecting that the location in the cache record corresponding to the current point of data access has been lost—in other words, the correct beginning of the tail list has been lost. According to the present embodiment of the invention, this condition may be indicated by the occurrence of a large number of insertions. Upon detecting the loss of the beginning of the tail list, the cache system may enter a search mode to attempt to find the beginning of the tail list. In this search mode, one or more of the on-chip buckets may be converted to hold only tags, instead of tags along with data. By holding only tags, these on-chip buckets are capable of storing a much longer record of cache entries. In fact, many buckets worth of tags may be stored into a single on-chip cache, and these buckets can be quickly checked for hits. Once a bucket having a hit is detected in this manner, the bucket may be loaded to continue normal operation. Buckets between the end of the head list and the first bucket having a hit in the tail list may be deleted, by moving them to the free list.

Also, if the free list is empty, entries from the tail list may be taken and used as free entries. This may be appropriate for the situation where accessed data changes significantly, and the cached bucket chain has to be rebuilt from scratch While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method of caching data, the method comprising:
   during a first frame:
      accessing a plurality of texels; and
      storing a tag in a first memory each time a texel in the plurality of texels is accessed; and
   during a second frame subsequent to the first frame:
      transferring a plurality of tags from the first memory to a second memory; and
      reading the plurality of tags from the second memory.

2. The method of claim 1 wherein the plurality of tags are read from the first memory and written to the second memory during the second frame.

3. The method of claim 1 wherein the method is performed on a graphics processor, the first memory is external to the graphics processor, the second memory is a cache on the graphics processor.

4. The method of claim 1 wherein accessing the plurality of texels comprises accessing a first plurality of texels, then accessing a second plurality of texels, and wherein the plurality of tags corresponds to the first plurality of texels.

5. A method of caching data, the method comprising:
during a first frame:
accessing a plurality of texels; and
storing an entry in a first memory each time a texel in the plurality of texels is accessed; and
transferring a plurality of entries from the first memory to a second memory; and
during a second frame subsequent to the first frame:
reading the plurality of entries from the second memory.

6. The method of claim 5 wherein storing an entry in the first memory comprises storing a tag and a texel value.

7. The method of claim 5 wherein storing an entry in the first memory comprises storing a tag.

8. The method of claim 5 wherein reading the plurality of entries from the second memory comprises reading a plurality of tags and texel values.

9. The method of claim 5 wherein reading the plurality of entries from the second memory comprises reading a plurality of tags.

10. The method of claim 5 wherein the plurality of entries are transferred from the first memory to the second memory during the second frame.

11. The method of claim 5 wherein the method is performed on a graphics processor, the first memory is external to the graphics processor, the second memory is a cache on the graphics processor.

12. The method of claim 5 wherein accessing the plurality of texels comprises accessing a first plurality of texels, then accessing a second plurality of texels, and wherein the plurality of entries corresponds to the first plurality of texels.

* * * * *